| United States Patent [19] | [11] 3,917,143 |
|---|---|
| Yourkievitz | [45] Nov. 4, 1975 |

[54] ADJUSTABLE STOCK FEED

[75] Inventor: David T. Yourkievitz, Eastlake, Ohio

[73] Assignee: Acme-Cleveland Corporation, Cleveland, Ohio

[22] Filed: May 11, 1973

[21] Appl. No.: 359,271

[52] U.S. Cl. .................... 226/141; 82/2.5; 214/1.1; 226/165
[51] Int. Cl.² .......................................... B23Q 5/22
[58] Field of Search ............... 214/1.1, 1.2, 1.3, 1.4, 214/1.5, 1.6, 1.7; 82/2.5, 2.7; 226/128, 129, 137, 139, 141, 142, 162, 165, 166

[56] References Cited
UNITED STATES PATENTS

| 2,763,365 | 9/1956 | Pulman | 226/141 |
| 3,814,299 | 6/1974 | Spercel | 226/162 |

Primary Examiner—Frank E. Werner
Attorney, Agent, or Firm—Woodling, Krost, Granger & Rust

[57] ABSTRACT

An adjustable stock feed is disclosed for a spindle of an automatic bar machine tool, either multiple or single spindle, wherein a stock feed pusher feeds bar stock into the spindle as moved under control of first and second cam and follower means. A cam drum is the first cam means with a first cam means with a fixed stroke and acts in series through linkage including the second cam and follower means to the stock feed pusher. The second cam and follower means includes a cam bar fixed at an adjustable angle relative to the stock feed pusher path of movement. This gives easily adjustable length of stroke yet one which retains the acceleration and deceleration characteristics of the first cam and of magnitudes proportional to the motion ratio of second cam to the first cam. This establishes that the bar stock at the end of stroke does not bounce off the stock stop. The foregoing abstract is merely a resume of one general application, is not a complete discussion of all principles of operation or applications, and is not to be construed as a limitation on the scope of the claimed subject matter.

15 Claims, 4 Drawing Figures

ADJUSTABLE STOCK FEED

BACKGROUND OF THE INVENTION

Multiple spindle automatic bar machine tools have used automatic feed of the bar stock for many decades. Such multiple spindle machines utilize a spindle carrier with plural; e.g. four, six, or eight spindles journaled in this indexable carrier. Usually the bar stock is fed at only one of these multiple index stations, just after cutoff of the completed work piece in the preceding station. Many multiple spindle automatics utilize a cam drum on which a chucking feed cam and a stock feed cam are secured. The chucking cam actuates the chuck or collets to open the collet just prior to stock feed in that particular station. The indexing and stock feeding movements are lost time so far as the machining of work pieces is concerned, so in order to increase the productivity of a given machine tool, attempts are always made to minimize the indexing time and stock feed time. This means that a setup man will usually use a stock feed cam with a steep slope for rapid feed forward of the bar stock. Also automatic machine tools are designed to be set up to machine many different configurations of work pieces; e.g. from one-half inch up to 8 inches in length. This means that the stock feed cam must be changed among several different available cams to achieve stock feed pusher strokes only slightly in excess of the work piece length for greatest productivity. In the past, many setup men would not change the stock feed but would leave installed a cam providing the longest feed stroke. This means that the bar stock, where a short work piece is required, moves rapidly only during the first portion of the travel of the cam follower on the feed cam. The feed cam has a deceleration portion to decelerate the bar stock prior to its striking the stock stop, but with an over-length stock feed cam and a short work piece, this deceleration portion would never be reached.

Other automatic machine tools have been provided with an adjustable length stock feed generally of the type where the stock feed cam acts through a lever with a fixed pivot and with an elongated slot on the opposite end of this lever. A link may be fixed in an adjustable position along the length of this slot, and the other end of the link is connected to the stock feed pusher. By adjusting the position along the slot, the effective stroke of the stock feed pusher may be adjusted; however, the varying attitudes of the link relative to the path of the stock feed pusher causes problems in efficient transfer of movement. If the link is at a substantial angle relative to the path of stock feed movement, then there is a considerable component of force which is perpendicular to this path and must be absorbed by the stock feed mechanism. Where a stock feed slide has for a long time been operated with only a short stroke and then the slide is attempted to be moved to a long stroke, there can be a wearing of the slide ways which will provide a bump in the progress of movement of the slide as it passes this previous end of slide movement.

Accordingly, an object of the invention is to obviate the above-mentioned disadvantages.

Another object of the invention is to provide an adjustable stock feed for a machine tool wherein the length of feed is easily adjustable.

Another object of the invention is to provide an adjustable bar stock feed wherein one cam provides rapid movement with desired acceleration and deceleration of the bar stock and a second cam in series therewith is adjustable for adjustable length of stroke.

Another object of the invention is to provide an automatic machine tool with a standard stock feed mechanism or alternatively with an attachment which will provide readily adjustable length of stock feed.

SUMMARY OF THE INVENTION

The invention may be incorporated in an adjustable stock feed for bar stock for a spindle of an automatic bar machine tool comprising in combination, a stock feed pusher to feed bar stock into the spindle, first cam and follower means with a fixed stroke, second cam and follower means, linkage means connecting said first cam and follower means in series through said second cam and follower means to said stock feed pusher, and means to vary the stroke of relative movement of said second cam and follower means to adjust the stroke of said stock feed pusher.

Other objects and a fuller understanding of the invention may be had by referring to the following description and claims, taken in conjunction with the accompanying drawing.

DESCRIPTION OF THE PREFERRED EMBODIMENT

Figure 1:
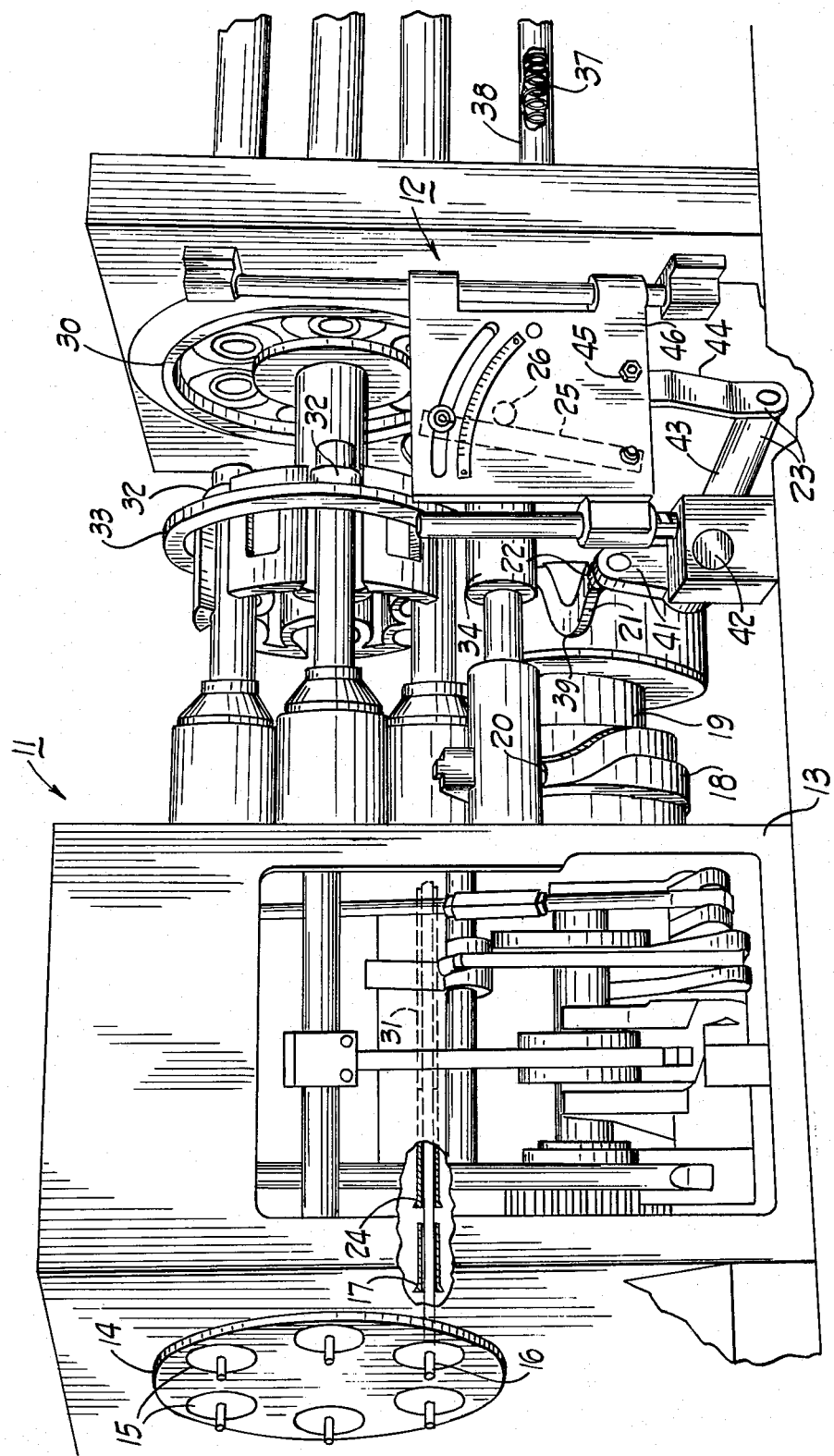
FIG. 1 is a perspective view of an automatic machine tool incorporating the adjustable stock feed of the invention.

The adjustable stock feed may be applied to many different machines, either multiple or single spindle, and FIG. 1 shows generally a multiple spindle automatic bar machine 11 which incorporates the adjustable stock stop 12 of the invention. The machine tool 11 includes a base 13 in which an indexable spindle carrier 14 is journaled. A plurality of spindles 15 shown herein as six in number are individually journaled symmetrically within the spindle carrier 14. Each of these spindles 15 carries the forward end of bar stock 16. In each spindle a chuck or collet 17 is provided to grip the bar stock as controlled by a chucking cam 18. As in many prior art constructions the chucking cam 18 may be mounted on a main cam drum 19 driven by some prime mover, not shown, within the machine. The chucking cam moves a cam follower 20 to open and close the collet 17 at appropriate intervals. FIG. 1 shows the cam follower 20 in the collet open position ready for stock feed. A stock feed cam 21, defined herein as a first cam, is mounted on the main cam drum 19. A first cam follower 22 cooperates with the stock feed cam 21. Linkage 23 is provided between the first cam and follower means 21, 22 and a stock feed pusher which includes a pusher collet 24. This linkage 23 includes a second cam 25 and a second cam follower 26.

The bar stock for the multiple spindles 15 is carried in a stock reel 30 which indexes directly with the spindle carrier 14. A pusher tube 31 connects the pusher collet 24 and a collar 32 in each extension of the spindle. The collar 32 is rearwardly of a stock feed ring 33. A longitudinally moving carriage 34 has a projection 35 acting on the stock feed ring 33. (See FIG. 3) A stock feed spring 37 is contained in a tube 38 and is an urging means urging forwardly the selected stock pusher tube 31. The selected stock pusher tube is for the spindle which at that particular index position is in the station of the spindle carrier where stock feed is to be accomplished. The urging of the spring 37 is resisted by the series connection of the first cam and follower 21, 22 and the second cam and follower 25, 26. As the first cam follower 22 moves to the left in FIG. 1 into a feed forward portion 39 of the stock feed cam 21, the linkage 23 is moved including movement of the second cam 25 vertically upwardly in FIG. 1, and this allows the spring 37 acting on the second cam follower 26 to move longitudinally to the left. This moves the carriage 34 to the left along with the stock feed ring 33 and the selected collar 32 and pusher tube 31. This feeds bar stock 16 forwardly which is to the left in FIG. 1.

Figure 4:
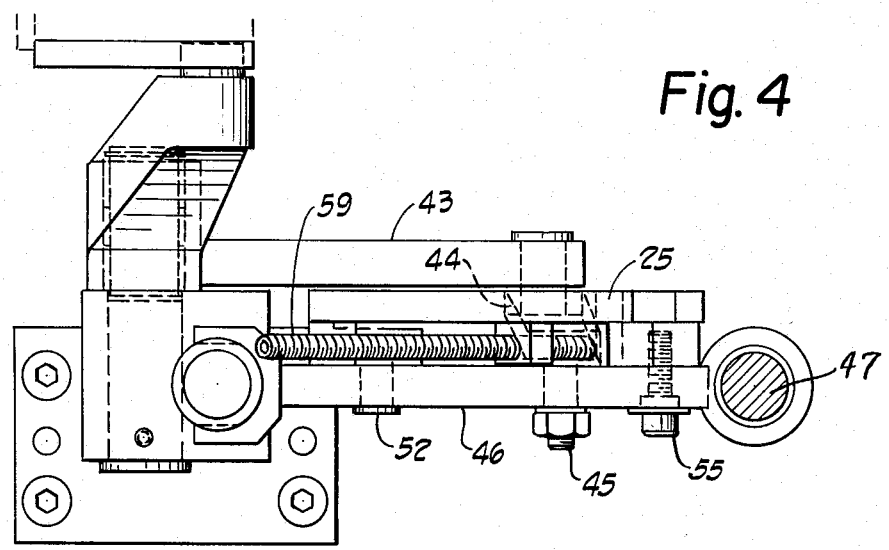
FIG. 4 is a top view of the stock feed.
Figure 2:
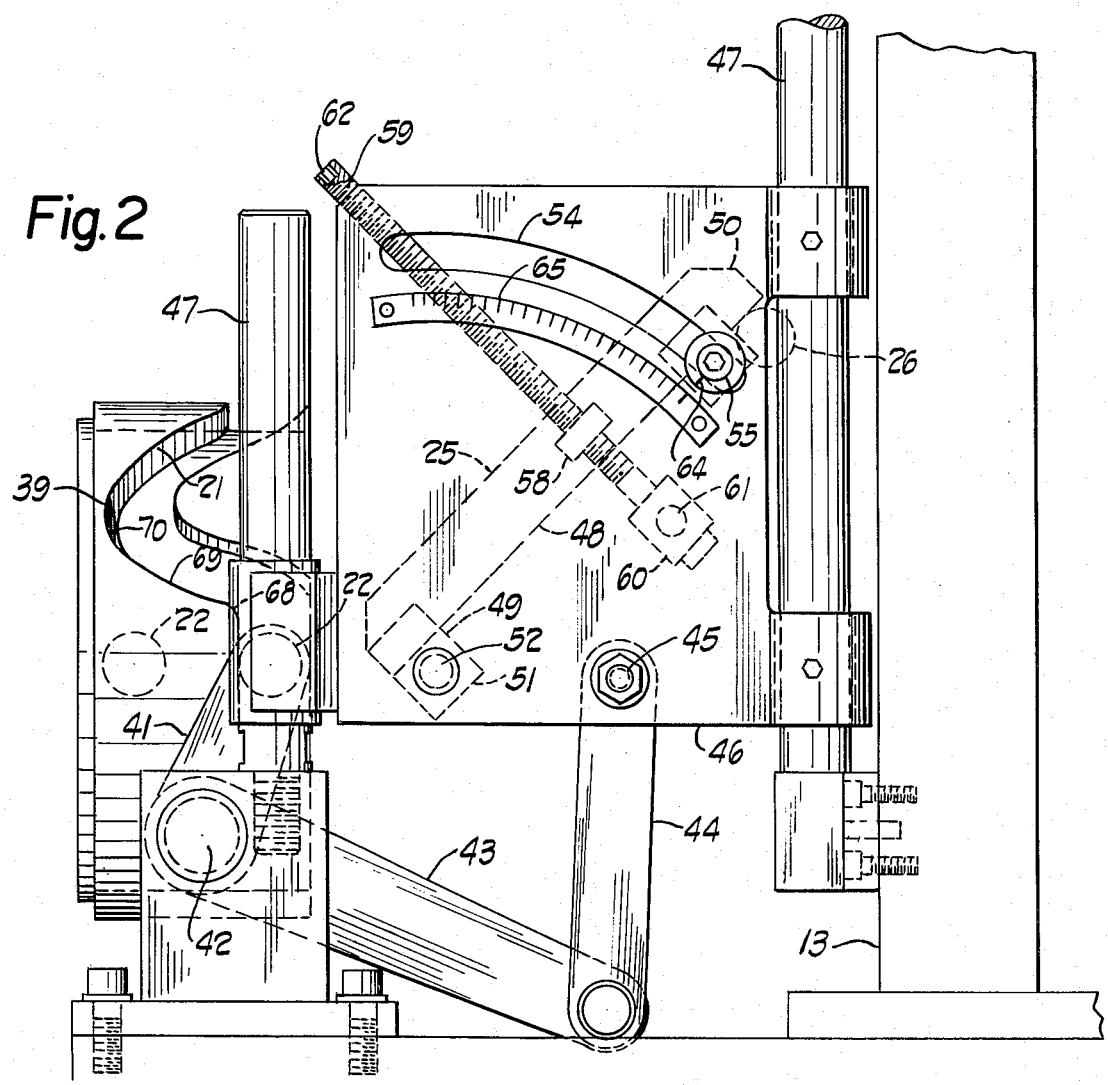
FIG. 2 is an elevational view of the adjustable stock feed.
Figure 3:
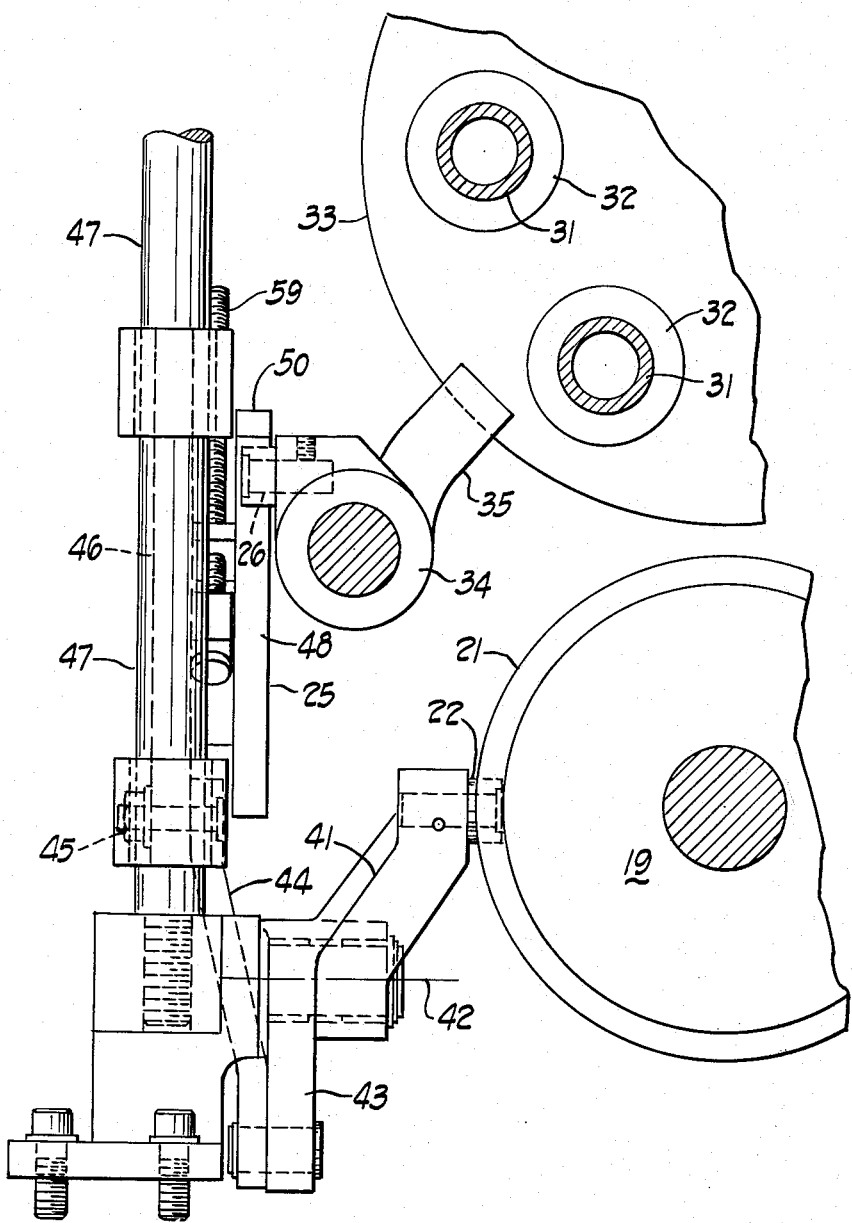
FIG. 3 is an end elevational view of the stock feed.

FIGS. 2, 3, and 4 show greater detail of the adjustable stock feed 12. FIG. 3 shows the stock feed cam 21 secured on the main cam drum 19. The first cam follower 22 cooperates with the cam 21 and is carried on a bell-crank lever 41 mounted on a fixed pivot 42 on the base 13. A long arm 43 of the lever 41 is pivotally attached to a link 44; the other end of which is pivotally attached by a pivot 45 to a vertically slide 46. This slide is supported and guided by slide bars 47.

The second cam and follower 25, 26 are associated with the slide 46. The second cam 25 is in the form of a cam bar which has a flat cam face 48 and has first and second ends 49 and 50. The first end 49 has an offset extension 51 containing a pivot with a pivot axis 52. The perpendicular distance from the pivot axis 52 to the flat cam face 48 is equal in the preferred embodiment to the radius of the second cam follower 26. An arcuate slot 54 is provided in the slide 46 about a radius from the pivot axis 52. A threaded fastener shown as a cap screw 55 extends through the arcuate slot 54 and is secured to the second cam 25. By loosening the threaded fastener 55 the angular position of the cam face 48 relative to the path of movement of the cam follower 26 and stock feed pusher may be adjusted.

To aid in this angular adjustment the cam 25 may include a boss 58 with a threaded aperture through which a threaded rod 59 extends. The lower end of the threaded rod is secured for rotation in a collar 60 which is pivoted at 61 on the slide 46. The outer end of the rod 59 may contain a tool socket 62 to receive a tool to rotate the rod 59. Rotation thereof with the cap screw 55 loosened will adjust the angular position of the cam 25.

OPERATION

The stock feed cam 21 is secured to the main cam drum 19 and this would not be changed from one set up to the next, such changing being customary with the prior art. This stock feed cam 21 accordingly has a fixed stroke which, for example, might be 3 inches to achieve a fixed stroke of the slide 46, for example of 7 inches. The second cam 25 may be adjusted at any desired angle; for example, any angle between vertical and 45° to the vertical. If the cam bar 25 were exactly vertical then there would be no stroke to the stock feed pusher 24. If the cam bar 25 is adjusted at a 45° angle to the vertical then a 7 inch vertical stroke of the slide 46 would result in a 7 inch stock feed movement. By adjusting the angle of the cam bar 25 to any angle in between these two limits, an adjustable stock feed is achieved. The cap screw may be loosened and the threaded rod 59 rotated. To adjust the angular position of the cam bar 25 an index mark 64 carried by the threaded fastener 55 may cooperate with a scale 65 to help the operator determine the proper angle for the desired feed stroke. Normally the desired feed stroke is slightly longer than the length of the work piece to be machined in order to take care of lost motion within the linkage and the width of the cut off tool. It will be appreciated that the length of the feed stroke will be proportional to the sine of the angle which the cam bar face 48 makes with the vertical.

After the spindle carrier 14 has indexed to a new station, the chucking cam 18 opens the collet 17 in the selected spindle which is in the stock feed station. This will be as shown in FIG. 1. Further rotation of the main cam drum 19 means that the first cam follower 22 will cooperate with the feed forward portion 39 of the stock feed cam 21. As seen in the FIGS. 1 and 2, the bell-crank lever 41 will pivot counter-clockwise moving the slide 46 vertically upwardly. The stock feed spring 37 will urge the second cam follower 26 to the left as now permitted by the vertical movement of the cam bar 25. The amount of stroke will be governed by the angle of the cam bar 25, and this moves the pusher collet 24 forwardly to feed out the desired amount of bar stock 16. Further rotation of the cam drum 19 closes the collet 17 to hold the bar stock 16 and then the stock feed cam 21 moves the bellcrank lever 41 clockwise. This lowers the slide 46 retracting the second cam follower 26 against the urging of the spring 37. This pulls the stock feed ring 33 rearwardly acting on the collar 32 to pull the pusher tube 31 and pusher collet 24 to the rear for a new grip on the bar stock 16.

The present invention has considerable advantages over the prior art construction which utilized only a single cam and follower. The present construction has first and second cam and follower means in series. In the prior art some setup men would never change the stock feed cam but leave installed on the machine the one with the longest feed stroke. This means that the bar stock, where only a short feed was required, would feed forwardly only from a point 68 (See FIG. 2) to another point 69 on the stock feed cam 21. Accordingly the cam follower 22 would never reach the deceleration portion 70 of this stock feed cam 21. This deceleration portion is quite important. It will be appreciated that the bar stock might be large and heavy; for example, as much as 3 or 4 inches in diameter and 16 feet long. Accordingly, the bar stock could weigh 500 pounds or more. For maximum productivity and minimum length of time during indexing and stock feed, the stock feed is attempted to be accomplished in a fraction of a second. This is considerable mass of bar stock to accelerate and decelerate. If the bar stock is decelerated smoothly by the cam deceleration portion 70, then there is little likelihood that the bar stock will bounce back after striking the stock stop. The feature of the enclosed or track cam 21 decreases the mass of bar stock necessary for the spring 37 to move since the entire adjustable feed is driven solely by the prime mover inside the machine. If in the prior art system the stock feed was only from point 68 to point 69, then the stock would not have a chance to decelerate before striking the stock stop and this could promote bounce back which would destroy the accuracy of the length of bar stock fed through the spindles. The present invention eliminates this problem.

The second cam and follower 25, 26 is a flat bar face 48. The cam face 48 does not need to have any deceleration portion, this being taken care of by the first cam 21. Also this straight face 48 assures the setup man that the stroke will be exactly as he sets it on the scale 65 according to the sine of the angle relative to the stock pusher path. By having the second cam 25 pivoted at the first end 49 thereof, this establishes that the termination of stock feed always may be effected when the center of the cam follower 26 coincides with the cam bar pivot axis 52. This is provided by making the perpendicular distance from the pivot axis 52 to the cam bar face 48 equal to the radius of the cam follower 26. This assures that regardless of the angle of cam bar 25, the deceleration portion 70 of the stock feed cam 21 will always be fully utilized at the end of the feed stroke.

The spring 37 has multiple functions in that it is an urging means urging forwardly the stock feed. It also urges together the second cam and follower 25, 26. This spring provides safety by providing a lost motion if the stock feed should jam for any reason. Positive motion may be obtained by providing on second cam 25 a parallel portion which would enclose the follower 26, thus eliminating the need for urging means 37. The slide 46 moves at an angle to the path of movement of the stock feed pusher 24 and in this preferred embodiment is perpendicular to this movement. The series combination of the first cam and follower means 21, 22 and the second cam and follower means 25, 26 resists the urging of the spring 37. The feed forward movement of the stock feed pusher 24 is permitted only when the cam follower 22 cooperates with the feed forward portion 39 of the stock feed cam 21.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An adjustable stock feed for bar stock for a spindle of an automatic bar machine tool comprising in combination, a stock feed pusher to feed bar stock into the spindle,
first cam and follower means,
second cam and follower means,
linkage means connecting said first cam and follower means in series through said second cam and follower means to said stock feed pusher,
said first cam and follower means establishing a fixed stroke of movement of said stock feed pusher,
and means to adjust the angle of one of said second cam and follower means relative to the machine tool to vary the stroke of relative movement of said second cam and follower means to adjust the stroke of said stock feed pusher.

2. A stock feed as set forth in claim 1 including means urging said stock feed pusher in the stock feed direction and resisted by said first and second cam and follower means.

3. A stock feed as set forth in claim 1 including motive means for said first cam, and said first cam and follower means controlling movement of said second cam means.

4. A stock feed as set forth in claim 1 including a cam bar as said second cam means,
and said stroke varying means including means to adjust the angle of said cam bar relative to the path of movement of said stock feed pusher.

5. A stock feed as set forth in claim 1 including means to establish relative movement between said second cam and follower means on a path at an angle to the path of movement of said stock feed pusher.

6. A stock feed as set forth in claim 5, wherein said angle is substantially a right angle.

7. A stock feed as set forth in claim 1 including a cam bar in said second cam and follower means,
and said stroke varying means including means to pivot said cam bar about one end thereof to an adjustable angle relative to the path of movement of said stock feed pusher.

8. A stock feed as set forth in claim 7 wherein said first cam means has a non-linear shape to decelerate said stock feed pusher gradually as the end of the stock feed motion is reached.

9. A stock feed as set forth in claim 7 including a flat operating face on said cam bar,
means pivoting said cam bar about a pivot axis spaced from said operating face a given distance,
and said second cam follower being a roller having a radius substantially equal to said given distance to establish completion of the stroke for stock feed as said second cam follower axis becomes substantially coincident with said pivot axis regardless of the angle of said cam bar relative to the path of movement of said stock feed pusher.

10. An adjustable stock feed for bar stock for a spindle of an automatic bar machine tool comprising, in combination, a base,
a stock feed cam journaled in said base,
a stock feed pusher to feed bar stock into the spindle,
a first cam follower cooperating with said stock feed cam,
linkage means connected between said first cam follower and said stock feed pusher,
a cam bar in said linkage means,
a second cam follower in said linkage means and cooperable with said cam bar,
and adjustable means to secure said cam bar in said linkage means in various angularly adjusted positions relative to the path of movement of said stock feed pusher.

11. A stock feed as set forth in claim 10, including means urging said stock feed pusher in a stock feed direction with said cam bar and stock feed cam resisting the movement of said stock feed pusher.

12. A stock feed as set forth in claim 10 including a slide in said linkage means,
and means securing said cam bar on said slide.

13. A stock feed as set forth in claim 12 including a bellcrank lever interconnecting said first cam follower means and said slide.

14. A stock feed as set forth in claim 13 including an arcuate slot in said slide,
and a threaded fastener passing through said arcuate slot as said securing means securing said cam bar to said slide in an adjusted position.

15. A stock feed as set forth in claim 13 including a threaded adjusting screw acting between said cam bar and said slide to adjust the angular position of said bar relative to said slide.

* * * * *